(12) United States Patent
Park et al.

(10) Patent No.: US 10,904,107 B2
(45) Date of Patent: Jan. 26, 2021

(54) SERVICE RESOURCE MANAGEMENT SYSTEM AND METHOD THEREOF

(71) Applicant: Bespin Global Inc., Seongnam-si (KR)

(72) Inventors: Wi Cheol Park, Yongin-si (KR); Sung Ho Hong, Yongin-si (KR); Young Su Bae, Seoul (KR); Sung Soo Kim, Yongin-si (KR)

(73) Assignee: Bespin Global Inc., Gyeonggi-do (KR)

( * ) Notice: Subject to any disclaimer, the term of this patent is extended or adjusted under 35 U.S.C. 154(b) by 0 days.

(21) Appl. No.: 16/143,999

(22) Filed: Sep. 27, 2018

(65) Prior Publication Data

US 2019/0149436 A1 May 16, 2019

(30) Foreign Application Priority Data

Nov. 10, 2017 (KR) ........................ 10-2017-0149128

(51) Int. Cl.
| | | |
|---|---|---|
| *H04L 12/24* | (2006.01) | |
| *H04L 12/915* | (2013.01) | |
| *H04L 29/08* | (2006.01) | |
| *H04L 12/911* | (2013.01) | |
| *H04L 12/26* | (2006.01) | |

(52) U.S. Cl.
CPC ...... *H04L 41/5051* (2013.01); *H04L 41/0886* (2013.01); *H04L 41/0893* (2013.01); *H04L 41/5054* (2013.01); *H04L 43/0876* (2013.01); *H04L 47/786* (2013.01); *H04L 47/828* (2013.01); *H04L 67/10* (2013.01); *H04L 67/16* (2013.01); *H04L 41/5096* (2013.01)

(58) Field of Classification Search
CPC ............. H04L 41/5051; H04L 43/0876; H04L 41/0886; H04L 41/5054; H04L 47/786; H04L 41/0893; H04L 67/16; H04L 67/10; H04L 47/828; H04L 41/5096; G06F 9/5072
See application file for complete search history.

(56) References Cited

U.S. PATENT DOCUMENTS

| | | | | |
|---|---|---|---|---|
| 8,805,971 | B1* | 8/2014 | Roth ..................... | G06F 9/5072 |
| | | | | 709/203 |
| 9,935,959 | B2* | 4/2018 | Keith ..................... | H04L 41/50 |
| 10,498,611 | B1* | 12/2019 | Kloberdans ............. | H04L 12/66 |
| 10,541,938 | B1* | 1/2020 | Timmerman ......... | H04L 43/065 |
| 2013/0238785 | A1* | 9/2013 | Hawk ................... | G06F 9/5077 |
| | | | | 709/224 |

(Continued)

FOREIGN PATENT DOCUMENTS

| | | |
|---|---|---|
| KR | 10-2011-0061777 A | 6/2011 |
| KR | 10-2013-0063867 A | 6/2013 |

(Continued)

*Primary Examiner* — Michael Won
(74) *Attorney, Agent, or Firm* — Paratus Law Group, PLLC (57) ABSTRACT

A service resource management system, including: a cloud data unit for storing a resource collected from a cloud service; a service group management unit for allocating the resource included in the cloud data unit to set a service group for providing a service; and a service group automatic generation module for automatically generating the service group for classifying the resource according to the setting thereof with the name including a key value or a tag value.

16 Claims, 6 Drawing Sheets

(56) References Cited

U.S. PATENT DOCUMENTS

| | | | |
|---|---|---|---|
| 2014/0052877 A1* | 2/2014 | Mao | H04L 12/4641 |
| | | | 709/245 |
| 2014/0059226 A1* | 2/2014 | Messerli | H04L 47/783 |
| | | | 709/226 |
| 2014/0108474 A1* | 4/2014 | David | G06F 16/182 |
| | | | 707/827 |
| 2014/0282889 A1* | 9/2014 | Ishaya | H04L 63/0876 |
| | | | 726/4 |
| 2015/0163158 A1* | 6/2015 | Ryland | H04L 41/0893 |
| | | | 709/225 |
| 2015/0312356 A1* | 10/2015 | Roth | G06F 11/3006 |
| | | | 709/226 |
| 2016/0094483 A1* | 3/2016 | Johnston | H04L 47/827 |
| | | | 709/226 |
| 2016/0132805 A1* | 5/2016 | Delacourt | G06F 8/65 |
| | | | 705/7.23 |
| 2017/0187806 A1 | 6/2017 | Wang et al. | |
| 2017/0300354 A1* | 10/2017 | Dalal | H04L 41/0843 |
| 2017/0339070 A1* | 11/2017 | Chang | H04L 47/829 |
| 2018/0157384 A1* | 6/2018 | Baneva | G06Q 10/06311 |
| 2019/0149344 A1* | 5/2019 | Kim | H04L 67/1002 |
| | | | 705/400 |
| 2019/0149436 A1* | 5/2019 | Park | H04L 41/5051 |
| | | | 709/226 |
| 2019/0296978 A1* | 9/2019 | Seshadri | H04L 63/20 |
| 2019/0327144 A1* | 10/2019 | Tembey | H04L 41/5048 |

FOREIGN PATENT DOCUMENTS

| | | |
|---|---|---|
| KR | 10-2014-0027518 A | 3/2014 |
| KR | 10-2015-0132774 A | 11/2015 |
| KR | 10-1578189 B1 | 12/2015 |
| KR | 10-2016-0109300 A | 9/2016 |

* cited by examiner

SERVICE RESOURCE MANAGEMENT SYSTEM AND METHOD THEREOF

CROSS REFERENCE TO PRIOR APPLICATION

This application claims priority to Korean Patent Application No. 10-2017-0149128 (filed on Nov. 10, 2017) which is hereby incorporated by reference in its entirety.

BACKGROUND

The present disclosure relates to a service resource management system and a method thereof, and more particularly, to a service resource management system and a method thereof for classifying and managing accumulated service resources and providing services.

A cloud system provides an environment for accessing a virtual server through a terminal and freely implementing a desired service.

The cloud system includes a service for renting some storage spaces to an individual to enable an individual user to store data in an allocated space by accessing through a terminal, and a service for providing an infra such as a basic computing environment or a network service, and a platform service for providing a platform or a solution for using a computer, and also includes a software service for enabling application software to be used over a network.

The cloud system is used in various applications such as mobile applications, games, shopping malls, and social network services.

In such a cloud system, a user who uses or provides the service can use the resource without time and space restrictions, and can also confirm the usage status in real time.

The cloud system can not only provide the service to perform the same role as the existing physical server, but also manage the provided service resources in real time and provide the search and classification function of the service resources.

However, in the conventional IT infra asset, there was a limited influence on the service in a situation where there was almost no change after purchasing, but in the cloud environment, it is directly related to the service quality, and the cost also varied according to the management capability.

Accordingly, the cloud system of a concept of borrowing resources needs to effectively manage the resources required for the service and to minimize the cost therefor in providing the service using the resources. Particularly, there is an increasing demand not only for more generalized and easy approach to resource management, but also for a more specialized approach to practical utility. Such a demand is identically applied to an Internet Data Center (IDC).

However, although the cloud system or the IDC can easily manage the service resources, there is a problem in that it is not yet possible to confirm the cost of utilization of the service resources and the cost of using the service resources in real time.

RELATED ART DOCUMENT

Patent Document (Patent Document 1) Korean Registered Patent No. 10-1578189 (Dec. 17, 2015)

SUMMARY

The present disclosure relates to a service resource management system and a method thereof, and more particularly, to a service resource management system and a method thereof for processing service resources of a cloud according to a service purpose to easily manage the service resources, and optimizing the costs thereby.

A service resource management system in accordance with the present disclosure includes a cloud data unit for storing a resource collected from a cloud service, a service group management unit for allocating the resource included in the cloud data unit to set a service group for providing a service, and a plurality of service groups generated by the service group management unit; and the service group management unit searches for the resource from the cloud data unit to allocate the searched resource to the service group automatically or manually according to the setting thereof, and provides the service in a unit of the service group according to a required service.

The service group management unit includes a resource manual mapping module for selecting a service group for allocating the resource, and collectively allocating the searched resources or some of the selected resources to the service group to map them.

The service group management unit includes a resource automatic mapping module for automatically extracting the resource from the cloud data unit according to the input setting therefrom to automatically allocate it to the service group to map it.

The service group management unit includes a management UI for inputting the setting for the resource allocated to the service group, and displaying the searched resource and information on the service group with respect to the data stored in the cloud service, and a search module for searching for the resource for each product of the cloud service and the resource associated with the resource allocated to the service group.

A method of a service resource management system of the present disclosure includes accumulating a resource in a cloud service; generating a service group for classifying the resource according to a service purpose or selecting any one of the service groups previously generated; searching for a resource to be allocated to the service group from the cloud service; allocating the resource to the service group that has been generated or selected; and providing a service based on the service group to which the resource is allocated.

The searching for the resource searches for a resource to be allocated through an intelligent search module or a resource associated with the resource allocated to the service group.

According to the present disclosure, it is possible to set a service group to classify the resources and accordingly, to provide a tool for conveniently managing the service resources and the cost, thus consistently processing and managing the service resources according to a purpose of providing the services, and to optimize the cost occurred by providing the service resources to easily confirm it, thus greatly enhancing the convenience and efficiency thereof.

In addition, the present disclosure can classify and manage the resources in real time according to each scale or each type of service regardless of the service type in various types of cloud systems, such that it is possible to manage the resources flexibly and conveniently, and it can classify a large amount of resources in a short time, such that it is possible to perform quick processing. As a result, it is possible to stably provide the service resource, and to enhance service quality.

DETAILED DESCRIPTION

The advantages and features of the present disclosure and the method for achieving them will become apparent with reference to the embodiments described in detail below with reference to the accompanying drawings. The present disclosure can, however, be embodied in various forms and should not be construed as limited to the embodiments disclosed below; these embodiments are only provided so that this disclosure will be thorough and complete and will fully convey the scope of the disclosure to those skilled in the art to which the present disclosure pertains; and the present disclosure is only defined by the scope of the claims. Like reference numerals refer to like elements throughout the specification. The present disclosure provides a social network service by transmitting and receiving data to and from a plurality of terminals through a network by the server including at least one processor.

Hereinafter, embodiments of the present disclosure will be described in detail with reference to the drawings.

Figure 1:
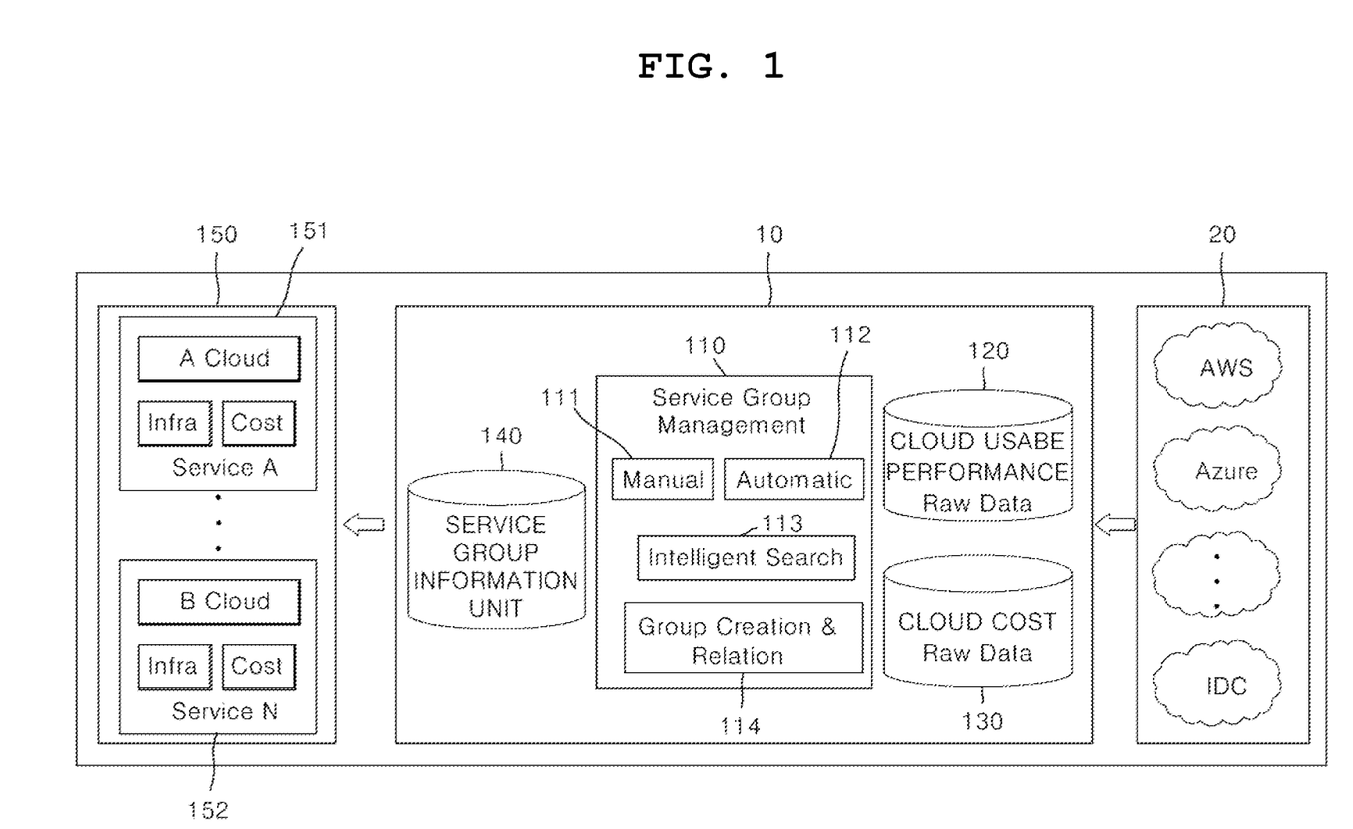
FIG. 1 is a block diagram illustrating a configuration of a service resource management system in accordance with the present disclosure.

FIG. 1 is a block diagram illustrating a configuration of a service resource management system in accordance with the present disclosure.

As illustrated in FIG. 1, a service resource management system 10 in accordance with the present disclosure is operated in an environment of a CLOUD server or an Internet Data Center 20, and manages a cloud asset used by a server and classifies and processes the data accumulated in the form required by the user to provide it to a user.

The CLOUD server or the Internet Data Center 20 provides various services such as simply providing a storage space, and providing an infra, a platform, and software according to a service providing form.

For example, the CLOUD server or the Internet Data Center 20 provides an IDC service as well as various cloud services such as QWS, Azure, and Soft-layer.

A new service based on the Internet can be provided to a user through a virtual server established through such a cloud service provider.

As the service resource management system accumulates a large amount of data, that is, service resources, through the cloud service, the service resource management system 10 provides by managing and processing the service resources in order to effectively provide it to the user.

The service resource management system 10 includes a cloud data unit 120 that is accumulated through a cloud service, a service group management unit 110 for classifying and processing data, a service group information unit 140, a cost data unit 130, and a service group 150 generated by the service group management unit.

The cloud data unit 120 stores resources collected at a certain cycle through the account of the cloud service. The cost data unit 130 stores cost information calculated based on the use of the cloud service and the traffic for the service resources. The cost information includes information on the degree of use and the cost therefor for the used service and the resource included in the service, and includes information on the service group of a billing service or the unit cost of the resource.

The service group management unit 110 classifies the resource of the cloud data unit 120 automatically or manually according to the setting of the resource of the cloud data unit 120, creates a service group corresponding thereto, and calculates the cost of using the service resource to store it in the cost data unit 130.

In addition, the service group management unit 110 displays information on service resources, a service group, setting information, and cost information, and generates and provides a UI for inputting setting.

The service group management unit 110 includes a manual mapping unit 111, an automatic mapping unit 112, a search unit 113, and a group generation unit 114.

The manual mapping unit 111 first selects a service name for a service group generated through the group generation unit 114, and then maps the searched service resource to the service group.

The automatic mapping unit 112 automatically classifies the service resource using a tag to allocate it to the service group.

The search unit 113 searches the resource allocated from the cloud data unit 120 to apply the searched result to the manual mapping unit or the automatic mapping unit.

The group generation unit 114 generates a service group according to the service name. The group generation unit 114 generates the service group according to automatic mapping or manual mapping, and automatically creates the service group by specifying a group name based on the key value allocated upon the automatic mapping.

TABLE 1

| Service Group ID | Resource ID | ... | ... |
|---|---|---|---|
| Service A | A Resource 1 | ... | ... |
| Service A | A Resource 2 | ... | ... |
| Service B | B Resource 1 | ... | ... |

As illustrated in Table 1, the resource is allocated and mapped for each service group.

TABLE 2

| Resource ID (Level 0) | Resource IDs | ... | Service Group A |
|---|---|---|---|
| Resource ENG | Resource A | ... | Allocated |
| Resource ENG | Resource B | ... | Automatically allocated |
| Resource A | Resource A-1 | ... | Automatically allocated |
| Resource A-1 | Resource A-A-1 | ... | Automatically allocated |

Accordingly, as illustrated in Table 2, the resource allocated to the service group can confirm the association as to whether or not the resource is a lower resource, and an association determination logic using an ID can be used.

The service group information unit 140 stores information on the generated service group.

The service group 150 is generated by the group generation unit to allocate the service resource through the manual mapping unit or the automatic mapping unit, and includes the cost information according to the use of the service resource.

Each of the service groups 151, 152 can allocate different service resources, respectively, or can share some same service resources. The service groups 151, 152 include the cloud used, the infra thereof, and the cost information.

The service group can repeatedly use a service group that is newly generated or previously generated, and can use by changing or updating the service resource of the previously generated service group if necessary.

The service resource management system 10 provides a service group including a service resource, an infra thereof, and cost information to a user in response to a user's request.

Figure 2:
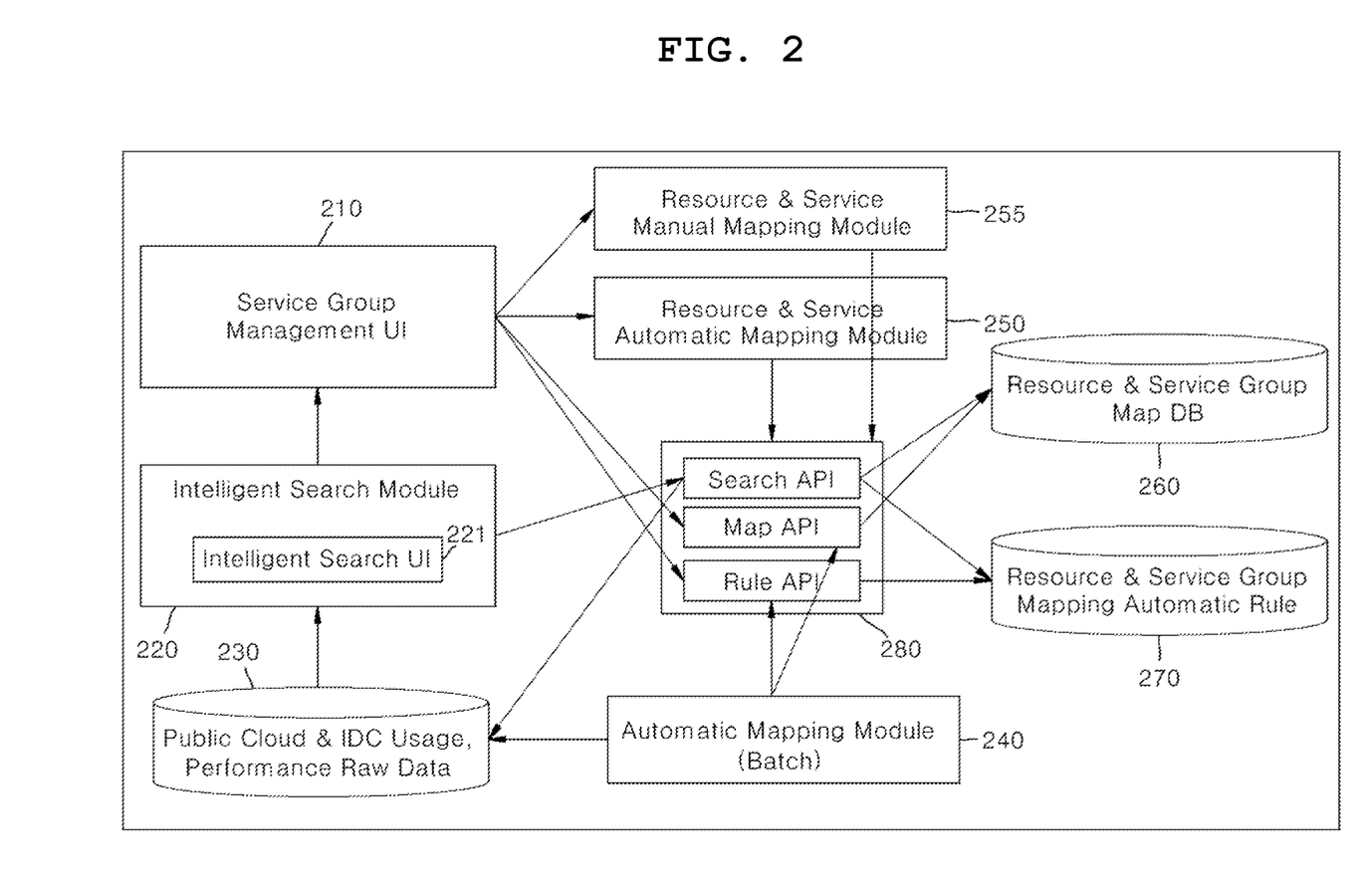
FIG. 2 is a block diagram illustrating a configuration according to the setting of a service group of the service resource management system in accordance with the present disclosure.

FIG. 2 is a block diagram illustrating a configuration according to the setting of a service group of the service resource management system in accordance with the present disclosure.

The service resource management system 10 classifies the service resource to allocate it to a service group, and includes the cost information in a unit of the service group. The service group management unit 110 of the service resource management system 10 is configured as follows in order to manage the service group. This configuration will be described based on a module that is executed by the service group management unit 110 of FIG. 1.

The service group management unit 110 includes a management UI 210, a search module 220 including a search UI 221, cloud data 230, 120, a resource automatic mapping module 250, a resource manual mapping module 255, a main module 280, an automatic mapping module 240, a resource and service group map DB 260, and a resource and service group mapping rule DB 270.

The search module 220 can correspond to the search unit 113, the resource automatic mapping module and the automatic mapping module can correspond to the automatic mapping unit 112, the resource manual mapping module can correspond to the manual mapping unit, the management UI, and the each DB and the main module can correspond to the group generation unit 114. However, FIG. 1 described above is a functional block diagram of each unit, FIG. 2 is a module-by-module description, and each module can be included in each unit by duplicate. For example, since the search module operates by interlocking with a search API of the main module, the main module can be included in the search unit as well as the group generation unit.

The management UI 210 generates and provides a setting for the service group and a user interface for managing the generated service group.

When the user terminal (not illustrated) is accessed to the management system, the management UI is transmitted to a user terminal and displayed, and the user can confirm the information displayed through the management UI and input the setting according to the service purpose. The criterion for classifying the service configuration resource is set according to the purpose of the service, and the infra configuration for hardware, software, and service provision can be changed.

The management UI 210 applies the data input from the user terminal to the main module 280. Accordingly, the main module 280 can execute the search module 220 through the search API 281 to search for a new resource, set a rule for the service group through the rule API 283, and execute the mapping module through the map API 282 to generate a new service group through resource mapping.

The search module 220 provides the search UI 221, and searches for the resource allocated from the cloud data units 230, 120 based on the data input through the search UI. The search module 220 is invoked by the search API 281, and applies the intelligent searched result to the main module or the management UI. Depending on the searched result, each resource is automatically or manually mapped to the service group through the mapping module. In addition, the search module can provide the searched result to the management UI to be displayed.

The automatic mapping module 240 analyzes the rules for collecting and storing the cloud data and allocating the collected cloud data to the service group as a service resource in the form of a batch file. The automatic mapping module 240 analyzes various rules set according to the automatic mapping setting so that the resource automatic mapping module can automatically allocate the service resource to the service group.

The resource automatic mapping module 250 automatically allocates the searched resource to the service group according to the setting based on the analyzed result of the automatic mapping module. The resource automatic mapping module 250 can not only allocate the resource to the previously generated service group, but also automatically generate the service group to allocate the resource thereto.

The resource automatic mapping module 250 allocates the resource to the service group based on the rule for the service group according to the setting inputted through the management UI. The resource automatic mapping module 250 operates by interlocking with the search API 281, the map API 282, and the rule API 283 of the main module 280. The main module 280 provides a rule for automatic mapping to the resource automatic mapping module, and stores the generated service group and the resource information therefor in the resource and service group mapping rule DB.

The resource manual mapping module 255 collectively or individually selects the resource searched through the search module 220 based on the searched result to allocate it to the service group.

The resource manual mapping module 255 classifies the type of the resource to be allocated for each service group or each of the collected resources, and constitutes data in a horizontal or vertical structure depending on the association of each resource. The resource manual mapping module 255 operates by interlocking with the search API 281 and the map API 282 of the main module 280, and the main module 280 stores the generated service group and the resource information therefor in the resource and service group mapping rule DB.

The main module 280 controls generation of the service group, manages the service groups such as inquiry, modification, and deletion of the service groups, and manages data stored in the DB.

The main module 280 invokes each module by executing the search API 281, the map API 282, and the rule API 283 provided by interlocking with the search module, the automatic resource mapping module, and the resource manual mapping module, and processes the data. In addition, the main module 280 manages the resource and service group map DB 260 and the resource and service group mapping rule DB 270, and invokes the necessary data to provide it to the automatic resource mapping module or the resource manual mapping module.

In addition, when the resource is allocated to the service group, the main module calculates the cost according to the resource in the service group to store the cost data in the cost data unit 130. The cost data is output through the management UI.

The resource and service group map DB 260 includes information on the generated service group and information on the resource allocated to the service group. In addition, the resource and service group mapping rule DB 270 stores setting information for automatic mapping, a resource selection criterion, a classification setting, and information for generating the service group.

Figure 3:
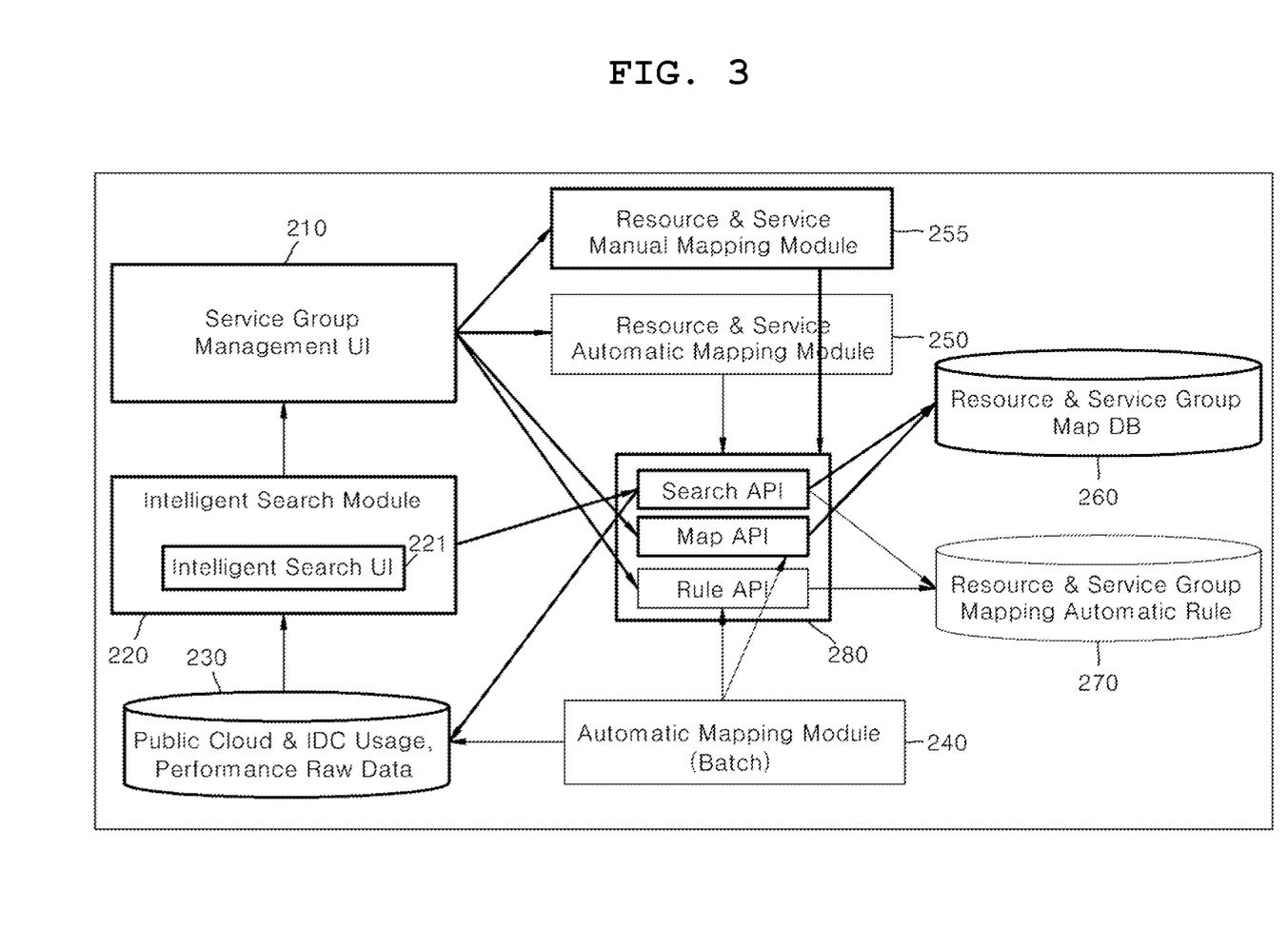
FIG. 3 is a block diagram illustrating a configuration of a manual mapping of the service group of the service resource management system in accordance with the present disclosure.

FIG. 3 is a block diagram illustrating a configuration for manual mapping of the service group of the service resource management system in accordance with the present disclosure. FIG. 3 illustrates only the configuration used in the manual mapping from FIG. 2 described above.

As illustrated in FIG. 3, when the resource is manually mapped, only a few modules operate to generate the service group and allocate the resource.

In the manual mapping, the service group is generated by the operations of the management UI 210, the search module 220 including the search UI 221, the cloud data 230, 120, the resource manual mapping module 255, the main module 280, and the resource and service group map DB 260.

The operations of the management UI 210, the search module 220 including the search UI 221, the cloud data 230, 120, and the main module 280 are as described above.

The service resource is collected for each cloud service to be stored in each cloud service. In the manual mapping, the main module generates the service group in order to classify the resources by the service group. The resource manual mapping module selects the service group for classifying the resource, searches for the resource to be allocated through the search module, and displays the searched resource.

The resource manual mapping module can collectively select the displayed resource to allocate it to the service group, or select some resources to allocate it to the service group. In this time, the resource among the searched resources can be selected by name to be allocated to the service group. The manual mapping can be manually mapped based on data input from the user terminal through the management UI.

The resource manual mapping module 255 sets either an independent mode or an associative mode to map the service resource to the service group independently or to map it to the service group based on the association.

In the independent mode, the resource manual mapping module 255 allocates the selected resource to the service group to map and classify it, and in the associative mode, the resource manual mapping module 255 classifies it into levels 0, 1, 2 . . . level n according to the association of the resource having the hierarchy structure to allocate it to the service group.

For example, when any one resource of the level 0 of the service resources is selected, the resource manual mapping module 255 allocates the resources of levels 1, 2 . . . level n associated to the corresponding resource to the same service group as the level 0.

The information on the service group, that is, the service group and the resource included therein, and the data on the association thereof is stored in the resource and service group mapping rule DB 270.

Figure 4:
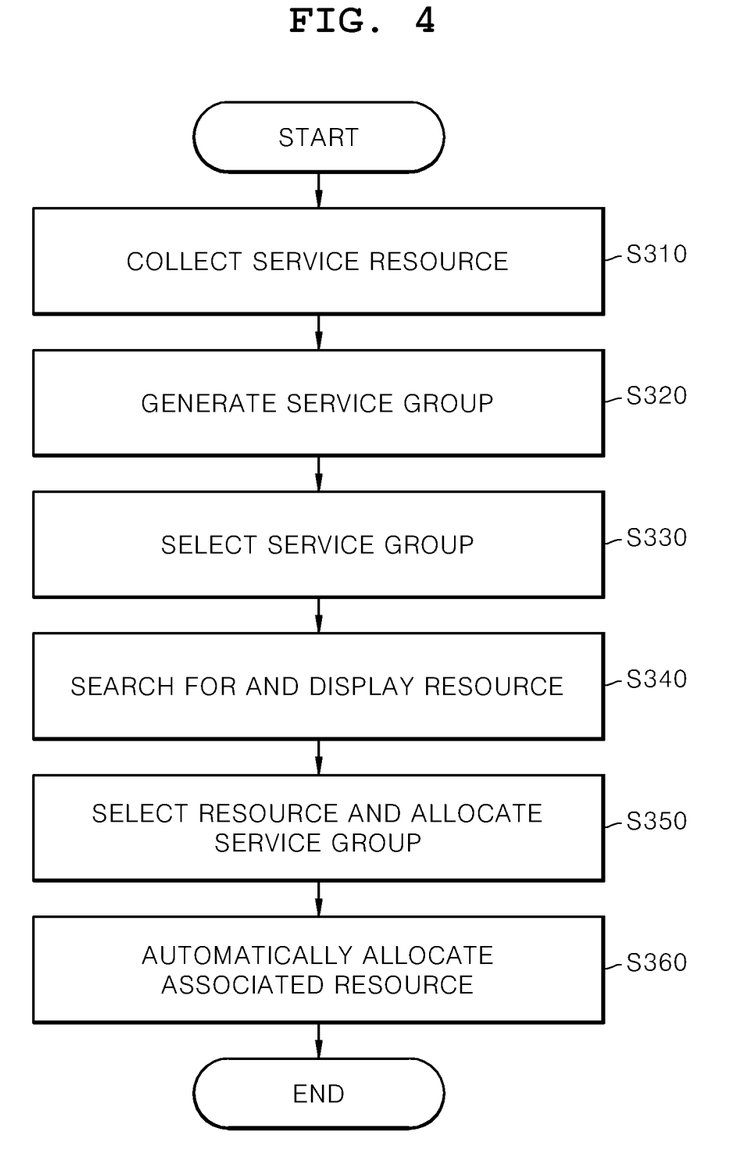
FIG. 4 is a flowchart explaining a method for manually mapping the service group of the service resource management system in accordance with the present disclosure.

FIG. 4 is a flowchart explaining a method for manually mapping the service group of the service resource management system in accordance with the present disclosure.

As illustrated in FIG. 4, data is accumulated through the cloud service 20 S310.

When the resource is manually mapped, the service resource management system 10 sets a plurality of service groups according to a service to be provided S320. The main module generates a service group based on the data input through the management UI.

The resource manual mapping module 255 selects the service group for classifying the resource S330, and the search module 220 searches for the resource to be allocated through the intelligent search function from the cloud data unit and displays the searched result S340. The searched result is displayed through the management UI. In this time, the main module invokes each module through the API to execute it.

The resource manual mapping module 255 collectively selects the searched result or selects a part thereof to allocate it to the service group S350. The searched resource can be selected by name.

For the resource allocated to the service group, the associated resource is automatically allocated to the service group S360. As described above, when the selected resource is referred to as level 0, data of level 1 to level n is allocated to the service group according to the association thereof.

The information on the service group is stored in the resource and service group mapping rule DB 270.

Figure 5:
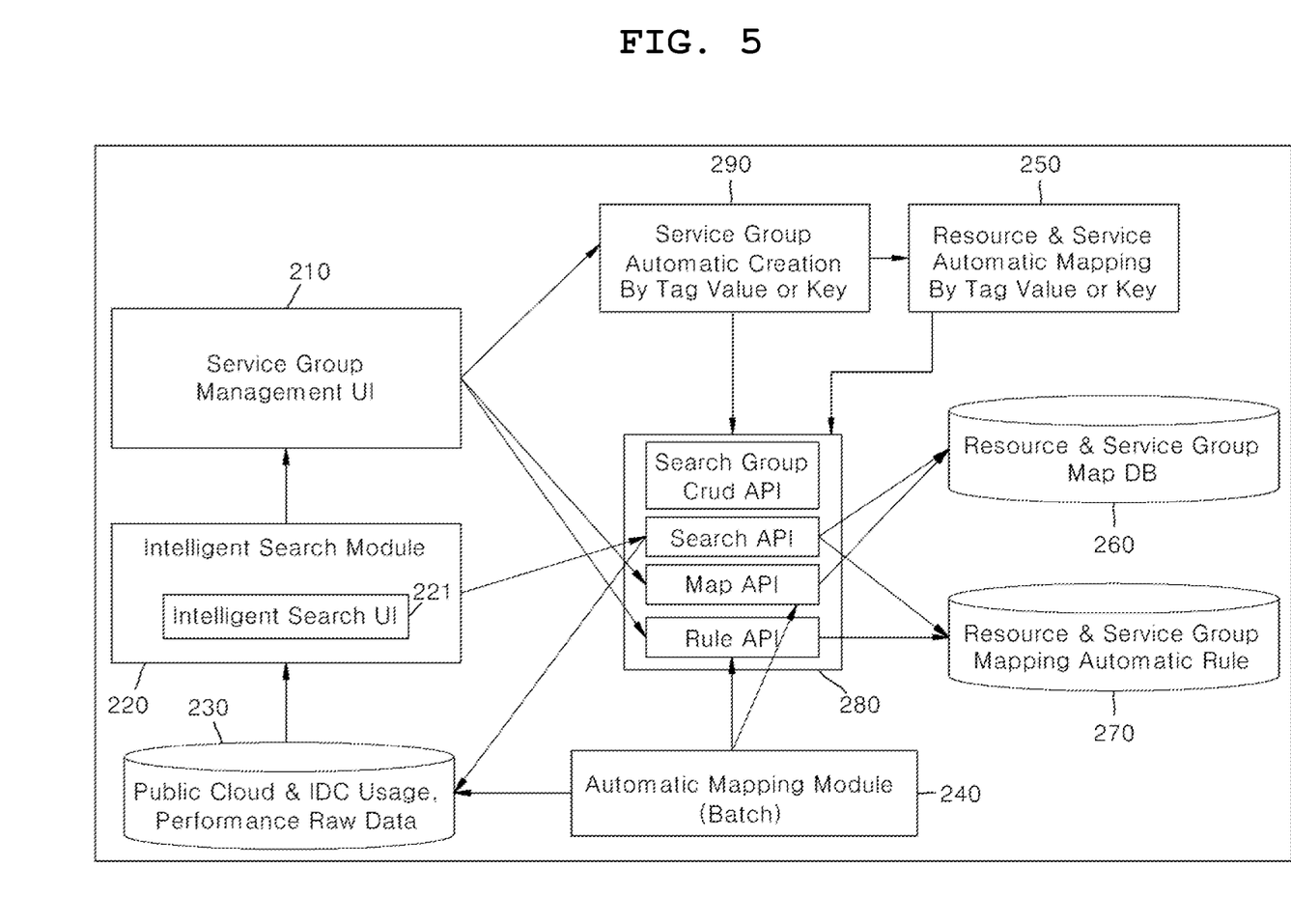
FIG. 5 is a block diagram illustrating a configuration of an automatic mapping of the service group of the service resource management system in accordance with the present disclosure.

FIG. 5 is a block diagram illustrating a configuration for automatic mapping of the service group of the service resource management system in accordance with the present disclosure.

As illustrated in FIG. 5, the service resource management system 10 automatically selects the resource based on the set rule to generate the service group.

In the automatic mapping, the service group is generated by the operations of the management UI 210, the search module 220 including the search UI 221, the cloud data 230, 120, the resource automatic mapping module 250, the main module 280, the resource and service group map DB 260, the resource and service group mapping rule DB 270, and a service group generation module 290 in the service group management unit 110.

The resource automatic mapping module 250 not only allocates the resource to the previously generated service group, but also automatically generates the service group to allocate the resource thereto.

In the automatic mapping, the service group generation module 290 automatically generates the service group using an input key value. The service group generation module can be included in the resource automatic mapping module 250 or can be configured as a separate module.

The service group generation module 290 automatically generates the service group with the name that is the same as or includes the key value, or the name that is the same as or includes a tag by using the key value or the tag by interlocking with the main module.

In the automatic mapping, the resource automatic mapping module 250 automatically allocates the resource corresponding to the key value or the tag to the service group.

Data for name generation and resource classification of the service group is input through the management UI, and is stored in the resource and service group mapping rule DB 270 as a rule for the service group. In this time, the rule for the service group can be set for each cloud service, and can be also set according to the type of the service.

The service group generation module automatically generates the service group based on the data input from the management UI, that is, the key value or the tag, and the resource automatic mapping module 250 classifies the resource based on the tag to allocate it to the service group.

In addition, the resource automatic mapping module 250 can collectively map the resource using any one of the previously generated service groups as a target service group in response to the input tag value without generating a new service group.

In order to automatically allocate the resource corresponding to the tag to the service group, the map API of the main module 280 invokes the resource automatic mapping module, and the resource automatic mapping module extracts the resource having the tag value among the cloud data to set a rule for the resource not allocated to the service while including the tag value to be collectively applied thereto. The generated rule is stored in the resource and service group mapping rule DB 270 by the rule API.

The resource automatic mapping module 250 extracts the resource having the tag value periodically according to the rule to allocate it to the service group, and automatically processes a newly generated resource for each tag as well.

Information on the generated service group is stored in the resource and service group map DB 260.

For example, in case of Company A providing a game service using a cloud resource, it is necessary to review a change in cost according to a user for the resource for each game service in order to manage sales for each game with respect to a plurality of games. In addition, when managing the infra according to the provision of the game service, it is necessary to manage the resource for each type of the infra.

In managing the use of resource, the cost, and the infra, it is possible to set the service group if necessary, that is, according to the purpose of managing the cost or the infra to manage it.

By classifying the resource and setting the service group, it is possible to calculate the cost of using the corresponding resource, or to manage the infra according to the resource usage automatically.

For example, it is possible to set a first service group for a game service and a service group for a game infra, and to set a tag and to generate an automation rule for the service group for the tag and a tag value thereof with respect to each service group.

As illustrated in Table 3, as the service group for the game service, the service group can be generated by a table tennis game, a soccer game, a golf game, etc. using the name of the game service as a key value, respectively.

Each service group thus generated can set a game name as a tag so that the resource is allocated based on the key value. The resource is automatically classified and allocated to the service group by a tag to calculate the cost therefor.

TABLE 3

| Service Group [GameServices.values] | Allocated Resource | Monthly Cost($) |
|---|---|---|
| Table tennis game | Table tennis Web, Table tennis WAS, Table tennis Mobile, Table tennis DB | 500 |
| Soccer game | Soccer Web, Soccer WAS, Soccer Mobile, Soccer_DB | 1,200 |
| Golf game | Golf Web, Golf WAS, Golf Mobile, Golf DB | 300 |

The service group for the table tennis game is allocated with the resource for a table tennis Web, a table tennis WAS, a table tennis Mobile, and a table tennis DB, and the cost is calculated according to the degree of use of the corresponding resource.

The monthly cost of the service group 'table tennis game' is charged according to the degree of use of the resource included in the service group, and the monthly cost of the service group 'soccer game' is charged according to the degree of use of the resource included in the corresponding service group.

By setting each game service as a service group to allocate the resource, it is possible to calculate data on the use of the resource and the cost therefor in a unit of the service group, and accordingly, to determine the sales and popularity thereby.

In addition, as illustrated in Table 4, by setting a service group and a tag for each infra with respect to a second service group for a game infra, it is possible to allocate the resource to calculate the degree of use and cost for each infra. In this time, the service group for the infra sets a tag key with the name of the game infra.

TABLE 4

| Infra Group [GameInfra.values] | Allocated Resource | Monthly Cost ($) |
|---|---|---|
| WebServer | Table tennis Web, Soccer Web, Golf Web | 200 |
| WASServer | Table tennis WAS, Soccer WAS, Golf WAS | 400 |
| MobileServer | Table tennis Mobile, Soccer Mobile, Golf Mobile | 600 |
| DBMS | Table tennis DB, Soccer DB, Golf DB | 800 |

Accordingly, the web server, the WAS server, the mobile server, and the DBMS are set as the respective service groups, and the tags are set so that the resources used for the respective service groups are allocated. For example, regarding the web server, the resources for a Table tennis web, a Soccer web, and a Golf web are allocated to the service group of the web server, and the cost is calculated according to the degree of use of the corresponding resource. The service group 'mobile server' includes the resources for a Table tennis mobile, a Soccer mobile, and a Golf mobile among the resources for serving a Table tennis game, a Soccer game, and a Golf game.

Accordingly, the Company A providing the game service can confirm the cost of using the resource for each game of the game service and the cost of using the resource for each infra through the setting of the service group, respectively.

Figure 6:
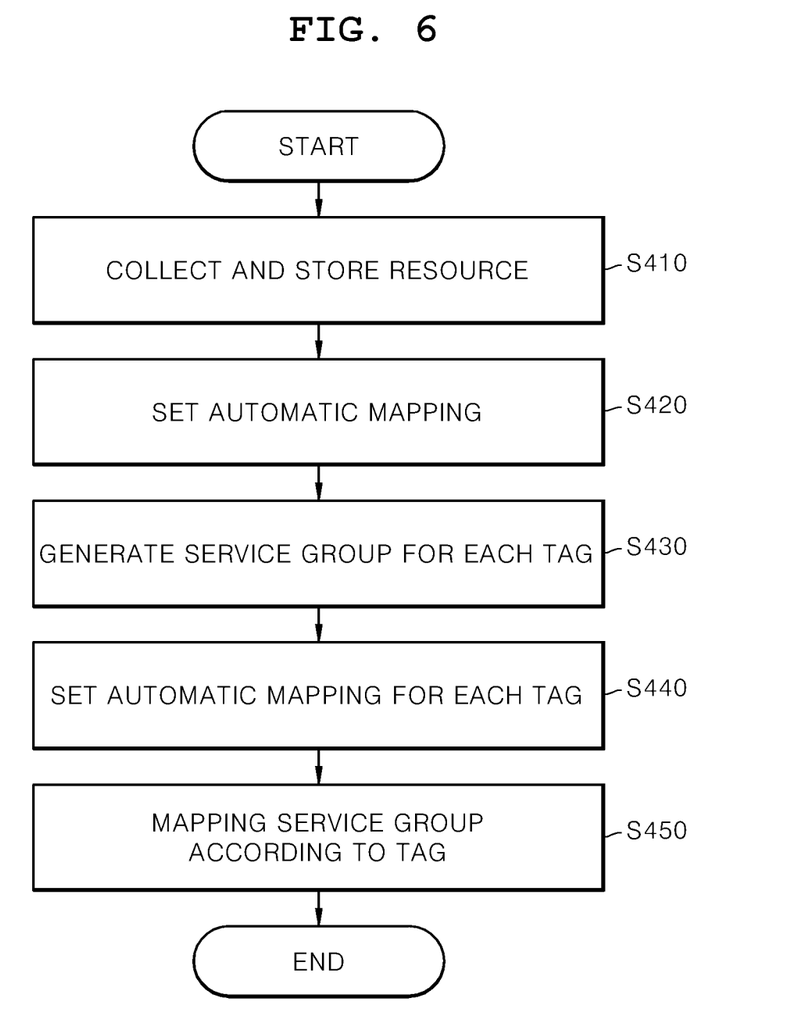
FIG. 6 is a flowchart explaining a method for automatically mapping the service group of the service resource management system in accordance with the present disclosure.

FIG. 6 is a flowchart explaining a method for automatically mapping the service group of the service resource management system in accordance with the present disclosure.

As illustrated in FIG. 6, data is accumulated through the cloud service 20 S410.

When the resource is automatically mapped, the service resource management system 10 sets a tag for the resource to be automatically mapped S420. In addition, the service resource management system 10 sets a key value for automatically setting a service group for the service group to which the resource is allocated.

In order to allocate the resource according to the tag, a service group is automatically generated based on the key value S430. The name of the service group is set as the key value or a tag value or as the name including the key value or the tag value to generate the service group.

A rule for automatic mapping is set so that the resource is searched from the cloud data unit based on the set tag to be automatically allocated S440.

The resource automatic mapping module extracts the resource that the tag is set from the cloud data unit to automatically allocate the resources to each service group for each tag S450. For example, the resource for a tag A is allocated to a service group A, and the resource for a tag B is automatically allocated to a service group B.

In addition, the resource automatic mapping module automatically allocates the resource that is associated to the resource allocated to the service group to the service group. As described above, the resource is automatically mapped by determining the association according to the level thereof.

In this time, the association of the resource according to the level thereof is illustrated in Table 5 below.

TABLE 5

| Level 0 | Level 1 | Level 2 | Level 3 |
|---------|---------|---------|---------|
| EC2 | AMIs | AUTO SCALING | |
| | SECURITY GROUP | | |
| | EBS | | |
| | ENI | EIP | |
| | VPC | NETWORK ACLs | |
| | | ROUTE TABLEs | |
| | | SUBNET | |
| | | ELB | |
| | INTERNET GATEWAYS | | |
| VPC | INTERNET GATEWAYS | | |
| | NETWORK ACLs | | |
| | ROUTE TABLEs | | |
| | ELB | | |
| | SUBNET | | |
| | EC2 | AMIs | AUTO SCALING |
| | | SECURITY GROUP | |
| | | EBS | |
| | | ENI | EIP |
| VM | Disks | | |
| | DNS | | |
| | Virtual IP | | |
| | Virtual Network | Virtual Network Subnet | |
| | Network Security Groups | | |

As illustrated in Table 5, level 1, level 2, and level 3 according to level 0 are determined by the setting of a provider for providing the cloud service.

For example, when the resource related to EC2 among resources of level 0 is allocated to a service group C, the resources for AMIs, Security Group, EBS, ENI, VPC, and Internet Gateways of level 1 associated with the EC2 can be allocated to the service group C. In addition, the resource Auto Scaling of level 2 associated with the AMIs of level 1 can be automatically mapped to the service group C as well.

Each service group can set a level to be automatically mapped. For example, the service group C can be set to level 2 to be automatically mapped, and a service group D can be set to level 3 to be automatically mapped.

The resource automatic mapping module extracts the resource from the cloud data unit at a predetermined cycle to automatically allocate it to the service group.

Accordingly, the present disclosure can set automatically or manually in allocating the resource to the service group, and can automatically set the service group through the setting of tag and allocate the resource. In addition, the resource required according to the purpose of the service can be allocated to the service group, and the service can be provided to the user in a unit of a service group. In addition, it is possible not only to set the mapping according to the service allocation through the management UI, but also to manage the cost therefor.

The present disclosure is not necessarily limited to these embodiments, as all the components constituting the embodiment of the present disclosure have been described as being combined and operating together. Within the scope of the present disclosure, depending on the embodiment, all of the components can also operate selectively in combination with one or more.

The above description is merely illustrative of the technical spirit of the present disclosure, and various modifications and changes can be made by those skilled in the art without departing from the essential characteristics of the present disclosure.

What is claimed is:

1. A service resource management system, comprising:
a cloud data unit configured to store a resource collected from a cloud service; and
a service group management unit configured to allocate the resource included in the cloud data unit to set a service group for providing a service and classifying the resource,
wherein the service group management unit searches for the resource from the cloud data unit to allocate the searched resource to the service group automatically or manually according to an input setting of the resource, and provides the service in a unit of the service group according to a required service,
wherein the service group management unit comprises
a service group automatic generation module configured to automatically generate, based on a tag included in the input setting, the service group to have a name including the tag, and
a resource automatic mapping module configured to automatically extract, from the cloud data unit, a plurality of the resources having the tag set thereto according to a rule for mapping included in the input setting, and automatically allocate the plurality of resources having the tag set thereto to the service group having the name including the tag to map the plurality of resources having the tag set thereto to the service group having the name including the tag,
wherein the service group automatic generation module is included in the resource automatic mapping module or is composed of a separate module,
wherein the service group management unit comprises a resource manual mapping module configured to select a service group for allocating the resource, and collectively allocating results of the searched resource or some of the results of the searched resource to the service group to map them,
wherein the resource manual mapping module sets the searched resource to any one mode of an independent mode or an associative mode to allocate the searched resource to the service group in the setting of the independent mode, and in the setting of the associative mode, additionally selects a resource associated with the searched resource to allocate the associated resource to the service group according to a level thereof,
wherein, in the setting of the associative mode, the searched resource is classified into one level of a plurality of levels, and resources of other levels of the plurality of levels associated with the searched resource are allocated to the service group to which the searched resource is allocated to, and
wherein the cloud data unit and the service group management unit are each implemented via at least one processor.

2. The service resource management system of claim 1, wherein the resource manual mapping module selects the searched resource with the name thereof to allocate the resource to the service group.

3. The service resource management system of claim 1, wherein the resource automatic mapping module classifies resources associated with the resource allocated to the service group based on a level set according to a hierarchy structure thereof to automatically allocate the resources to the service group.

4. The service resource management system of claim 1, wherein the service group management unit sets setting information for automatic mapping, a resource selection criterion, a classification setting, and information for generating a service group as the rule for mapping to store the rule in a resource and service group mapping rule DB in response to the setting.

5. The service resource management system of claim 1, wherein the resource automatic mapping module periodically extracts the resource that the tag is set to allocate the resource to the service group corresponding to the tag according to a predetermined rule, and allocates the resource to each service group for each tag with respect to a newly generated resource.

6. The service resource management system of claim 1, wherein the service group management unit comprises a main module that is composed of an API for invoking a module for searching, managing, and mapping in order to provide the resource according to a service purpose, and executing an operation for storing data.

7. The service resource management system of claim 1, wherein the service group management unit comprises:
a management UI configured to input the setting for the resource allocated to the service group, and displaying the searched resource and information on the service group with respect to data stored in the cloud service, and
a search module configured to search for a resource for each product of the cloud service and a resource associated with the resource allocated to the service group.

8. A method for managing a resource in a service resource management system, comprising:
accumulating a resource in a cloud service;
generating a service group for classifying the resource according to a service purpose or selecting any one of the service groups previously generated;
searching for a resource to be allocated to the service group from the cloud service;
allocating the searched resource to the service group that has been generated or selected according to an input setting of the resource;
providing a service based on the service group to which the resource is allocated;
automatically generating, based on a tag included in the input setting, the service group to have a name including the tag;
automatically extracting, from the resources included in the cloud service, a plurality of resources having the tag set thereto according to a rule for mapping included in the input setting;
automatically allocating the plurality of resources having the tag set thereto to a service group having the name including the tag to map the extracted plurality of resources having the tag set thereto to the service group having the name including the tag
selecting a service group for allocating the resource, and collectively allocating results of the searched resource or some of the results of the searched resource to the service group to map them; and
setting the searched resource to any one mode of an independent mode or an associative mode to allocate the searched resource to the service group in the setting of the independent mode, and in the setting of the associative mode, additionally selecting a resource associated with the searched resource to allocate the associated resource to the service group according to a level thereof,
wherein, in the setting of the associative mode, the searched resource is classified into one level of a plurality of levels, and resources of other levels of the plurality of levels associated with the searched resource are allocated to the service group to which the searched resource is allocated to.

9. The method for managing the resource in the service resource management system of claim 8, wherein the searching for the resource searches for a resource to be allocated through an intelligent search module or a resource associated with the resource allocated to the service group.

10. The method for managing the resource in the service resource management system of claim 8, further comprising:
inputting the input setting for the resource allocated to the service group through a management UI before the searching for the resource; and
displaying the searched resource and information on the service group through the management UI.

11. The method for managing the resource in the service resource management system of claim 8, further comprising:
setting setting information for automatic mapping, a resource selection criterion, a classification setting, and information for generating a service group as a rule for mapping in the automatic mapping before the searching for the resource.

12. The method for managing the resource in the service resource management system of claim 8, further comprising:
automatically allocating the resource to each service group by periodically extracting the resource having the tag or a resource associated with the resource allocated to the service group according to a predetermined rule.

13. The method for managing the resource in the service resource management system of claim 8, wherein in a manual mapping, the searched resource is selected with a name and the selected resource is allocated to the service group.

14. The service resource management system of claim 1, wherein, when the resource is allocated to the service group, the service group management unit calculates cost information according to the resource in the service group.

15. The service resource management system of claim 14, wherein the cost information includes at least one of information on a degree of use of the resource, or a degree of cost of the resource.

16. The service resource management system of claim 14, wherein the cost information includes a cost of use of the resource in a unit of the service group.

* * * * *